United States Patent

Balm

[15] 3,651,462

[45] Mar. 21, 1972

[54] SINGLE SCAN CHARACTER REGISTRATION

[72] Inventor: Gerald J. Balm, Rochester, Minn.

[73] Assignee: International Business Machines Corporation, Armonk, N.Y.

[22] Filed: July 20, 1970

[21] Appl. No.: 57,381

[52] U.S. Cl. ....................................................340/146.3 H

[51] Int. Cl. ....................................................G06k 9/04

[58] Field of Search .............340/146.3 H, 146.3; 235/92 CC

[56] References Cited

UNITED STATES PATENTS 2,898,576 8/1959 Bozeman ............................340/146.3

3,289,161 11/1966 Gattner et al.......................340/146.3

3,346,845 10/1967 Fomenko............................340/146.3

OTHER PUBLICATIONS

IBM Tech. Discl. Bull' n entitled " OCR Vertical Registration System," by Demer, F. M., Vol. 9, No. 10 Mar. 1967, pp. 1,367- 1,370.

*Primary Examiner*—Thomas A. Robinson
*Attorney*—Hanifin and Jancin and J. Michael Anglin

[57] ABSTRACT

An improved method and apparatus are shown for selecting and registering data bits from a single scan line which data bits represent only a portion of an alpha-numeric character. Registration is controlled by the location of the data bits representing the portion of the character from each scan and a registration reference signal determined from the location of data bits from previous scans.

14 Claims, 5 Drawing Figures

INVENTOR
GERALD J. BALM
BY [signature]
ATTORNEY

SINGLE SCAN CHARACTER REGISTRATION

FIELD OF THE INVENTION

This invention relates to the field of character recognition systems in general and more specifically to intelligence comparison. In particular, this invention contemplates a method and apparatus for selecting and registering digital data bits representing a portion of an alpha-numeric character, as received from a scanning unit.

DESCRIPTION OF THE PRIOR ART

When scanning an alpha-numeric character in preparation for recognizing such character, an area larger than the size of the character must be scanned. This is to insure that the character is completely scanned even though it may be inaccurately positioned. Registration of the image is then required if one is to accurately compare the image with a reference image or mask in order to recognize the character. A common registration method is to read an entire character-bearing area into a shift register, and then to move the character image electronically to a predetermined center or corner position within the register. Another common method is to pre-scan the document area, then to move a subsequent recognition scan to an aligned position with respect to the character image. It has also been proposed to move data from each scan, completely independently of the remaining scans, so that the first black video occupies a predetermined position within that scan. While this last technique may be adequate for registering numeric characters, it is not adequate for registering alpha-numeric characters, because the distortion introduced by the registration causes several alpha-numeric characters to look alike after registration. For example, the letters "H", "N", and "U" will all look alike after registration.

SUMMARY OF THE INVENTION

It is the object of the instant invention to register alpha-numeric characters without introducing distortion which would result in ambiguities between registered alpha-numeric characters.

It is a further object of this invention to utilize information from preceding scans to control the registration of data within each scan.

The method and apparatus of the instant invention accomplishes the objects set forth above by utilizing two conditions when controlling the registration of data bits within a scan. A first condition is the location of bits representing a portion of a character within a scan. The second condition is the location of bits representing a portion of the character in the previous scans. The number of bits present between a start of a scan and a first data bit, representing a portion of a character in the scan, is counted. If this number of bits present is less than a previous number of bits between a start of a previous scan and a first data bit representing a portion of a character in the previous scan, registration is controlled by the number of present bits. If the number of present bits is greater than the previous number, registration is controlled by the previous number. In other words, an Xth bit and all following bits from each scan are selected and registered. X is a number equal to the smaller of the number of bits between the start of the present scan and the first bit representing a portion of a character being scanned or the number of bits between the start of a previous scan and the first bit in the previous scan representing a portion of the character being scanned.

A BRIEF DESCRIPTION OF THE DRAWINGS

DESCRIPTION OF THE PREFERRED EMBODIMENT

Figure 1:
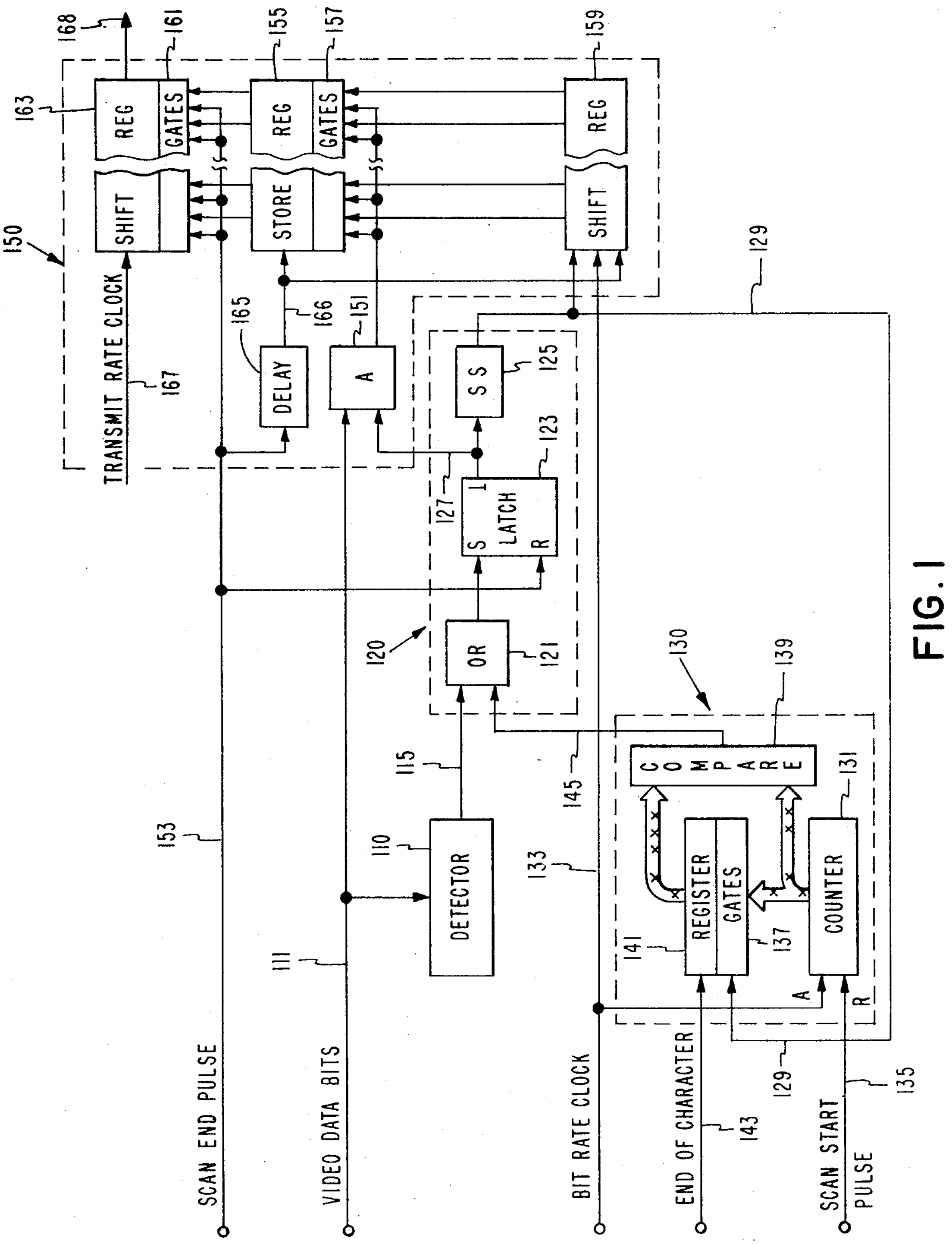
FIG. 1 shows a circuit diagram of apparatus for selecting and registering data according to the instant invention.
Figure 4:
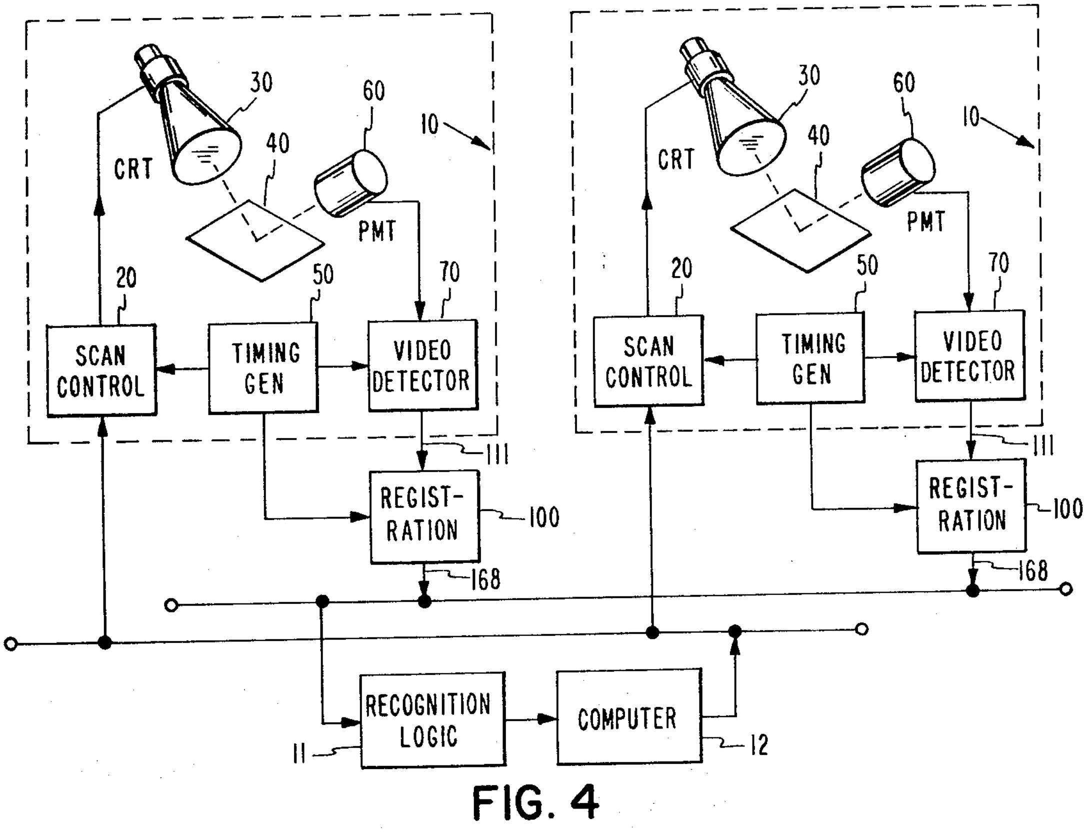
FIG. 4 shows how the circuit of FIG. 1 may be used within a remote scanning system to select and register scan data prior to transmission to a centrally located recognition logic and a computer.

The invention is illustrated in FIG. 1 by means of example circuitry. It is contemplated that the disclosed circuitry will be used in conjunction with one or more scanning units such as scanning units 10 shown in FIG. 4. Scanning unit 10 has a scan control 20 which generates the ramp wave forms necessary to cause cathode ray tube 30 to generate a raster scan over an area 40 including an alpha-numeric character. Scan control 20 operates under control of computer 12 and timing generator 50. Timing generator 50 includes an oscillator, various rate clock generators, a scan start pulse generator and a scan end pulse generator which, although not shown, are well known components. Timing generator 50 is also connected to, and synchronizes the operation of video detector 70 and registration unit 100. As light from scanning cathode ray tube 30 reflects off scanning area 40 including an alpha-numeric character, fluctuations in light intensity are detected by photomultiplier tube 60 and converted into a group of digital data bits within video detector 70. The output of video detector 70 is a series of video data bits. The output of registration unit 100, as shown in FIG. 4, is connected to a centrally located recognition logic unit 11, which is in turn connected to computer 12. The recognition logic unit 11 and computer 12 utilize the registered video data and in turn control scan control 20 of each of a possible plurality of remote scanning units 10. Registration unit 100 selects and registers data bits from each scan which represent a portion of an alpha-numeric character, to allow economical transmission from the remote scanning unit 10 and accurate recognition by recognition logic unit 11.

The detailed circuitry of registration unit 100 will now be described with reference to FIG. 1. Video data as received from the video detector is provided to detection means 110, via input 111. Detection means 110 provides an output on line 115 whenever a data bit representing a dark portion of the scan is received. Detection means 110 may be a simple Schmitt trigger, well known in the art.

In order to control selection and registration of scan data bits, a control means 120 is provided. Control means 120 has inputs connected to lines 115, 145, and 153 and provides outputs on lines 127 and 129. Control means 120 includes OR-circuit 121, bistable storage means 123, hereinafter called latch 123, and single shot pulse generating circuit 125. Whenever detection means 110 provides an output, OR-circuit 121 sets latch 123 to provide an output on line 127. Latch 123 within control circuit 120 is also set by registration reference means 130.

Registration reference means 130 provides an output whenever a number of clock pulses received after a scan start pulse is equal to a previous number of clock pulses between a scan start pulse of a previous scan and a character-detected pulse i.e., first dark bit) of the previous scan. Registration reference means 130 includes a binary counter 131 which is advanced one count with each bit rate clock pulse which appears on input line 133. Binary counter 131 is reset at the start of each new scan by a scan start pulse which appears on reset input 135. Each stage of binary counter 131 has an output connected to an input of gate circuits 137 and an input of compare circuit 139. Another input of each of gate circuit 137 is connected to output line 129 from control means 120. Whenever a signal appears on output line 129, gate circuits 137 open to transfer the count of counter 131 into the register 141. Register 141 also has an input 143 which receives a conventional segmentation or end-of-character pulse at the end of each character. The pulse received on input 143 fills register 141 to an all-ones-condition which is in effect, the opposite of a reset condition. Each stage of register 141 has an output connected to an input of compare circuit 139. Compare circuit 139 provides an output on line 145 whenever the binary count stored in register 141 is equal to the binary count of counter 131. Line 145 is connected to a second input of OR-circuit 121 of control means 120 to set latch 123 whenever the contents of register 141 is equal to the count of counter 131. Counter 131 and register 141 have a sufficient number of stages so that they can store a binary number greater than the maximum of number of digital data bits that can be received from the scanning unit during any one scan. Gate circuit 137 and compare 139 each have a number of individual circuits equal to the number of stages in counter 131 and register 141.

Output line 127 of control means 120 is connected to an input of AND-circuit 151 of gate means 150. The other input of AND-circuit 151 is connected to input line 111 to receive scan data from video detector 70. The operation of AND-circuit 151 within gate means 150 is such as to effectively discard scan data bits whenever latch 123 is not set by disabling AND-circuit 151. Whenever latch circuit 123 is set, AND-gate 151 is enabled, allowing scan data bits to pass through, thereby effectively selecting and registering such scan data bits. Prior to transmission to recognition logic 11, the scan data bits are temporarily stored in storage register 155 via gates 157. One input of each of gates 157 is connected to the output of AND-gate 151. The other input of each of gates 157 is connected to a different stage of shift register 159. Shift register 159 has a load input connected to line 129. Whenever latch 123 is first set, single shot 125 provides an output pulse which loads a bit in the first stage of shift register 159. When a bit exists in the first stage of shift register 159, the first gate of gates 157 is opened, allowing the first scan data bit to be gated through AND-circuit 151 to be stored in the first stage of storage register 155. Shift register 159 also has a shift input which is connected to bit rate clock line 133. As each scan data bit is received, a bit rate clock pulse shifts the single bit stored in register 159, one position to the right. This causes each scan data bit to be stored in a different stage of storage register 155 in a sequential order from left to right.

The output of each stage of storage register 155 is connected to an input of gates 161. The other input of each of gates 161 is connected to scan-end pulse line 153. Whenever a scan-end pulse is generated in scanning unit 10 of FIG. 4, the registered and selected data bits stored in storage register 155 are gated into shift register 163. Each scan-end pulse also resets latch 123 in preparation for the next scan. Each scan-end pulse appearing on line 153 also enters delay circuit 165. The output 166 of delay circuit 165 appears after a short time delay and resets storage register 155 to zero in preparation for receiving scan data bits during the next scan and also resets shift register 159 to zero. Each of registers 155, 159, and 163 has a number of stages which is equal to the number of scan data bits required to accurately represent an alpha-numeric character. The number of stages of registers 155, 159, and 163 will usually be less than the number of scan data bits received from scanning unit 10. This is because scanning unit 10 must scan a wider area than necessary in order to insure that a character which may be erroneously positioned within the scanning area, will be scanned.

The registration and selection logic of FIG. 1 allows scan data bits occurring prior to an alpha-numeric character and scan data bits occurring after an alpha-numeric character to be discarded. Only those scan data bits beginning with the first scan data bit representing the alpha-numeric character and the following number of scan data bits beginning with the first scan data bit representing the alpha-numeric character and the following number of scan data bits required to completely represent the alpha-numeric character are transmitted to recognition logic unit 11. Since a smaller number of scan data bits are transmitted than are received from scanning unit 10, the transmit rate clock frequency on line 167 which empties shift register 163 onto the communication line 168 connecting it with recognition logic 11 can be at a lower and a more practical transmission frequency than the frequency of the bit rate clock on line 133. All timing and clock pulses on lines 133, 135 and 167 may be obtained by conventional means from timing generator 50, FIG. 1. While information from one scan is being selected and stored in register 155, the selected scan data bits from the previous scan are being transmitted out of shift register 163 to the recognition logic unit.

Figures 2A, 2B, 3:
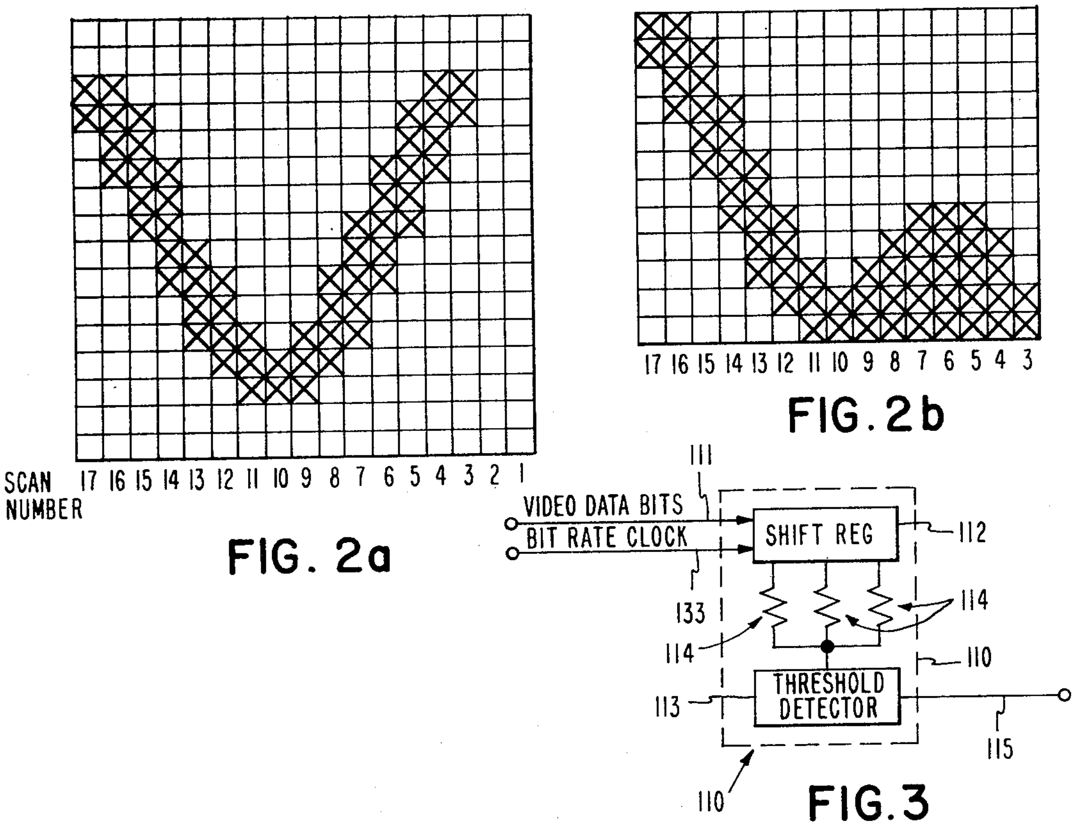
FIGS. 2A and 2B show an example of registration of a character. The alpha-numeric letter "V" is shown prior to registration in FIG. 2A and after registration in FIG. 2B.
FIG. 3 shows an alternate embodiment of a detector which detects when a first bit representing a portion of an alpha-numeric character has been received from a scanning unit.

FIG. 3 shows an alternate embodiment of detection means 110. As shown in FIG. 3, detection means 110 includes a shift register 112 for receiving scan data bits from input 111. Shift register 112 has a shift input connected to line 133 for receiving bit rate clock pulses. The bit rate clock pulses propagate video data bits through shift register 112 and onto line 115. Each stage of shift register 112 has an output connected to a weighting resistor 114. The other terminal of each weighting resistor 114 is connected to the input of threshold detector 113. This embodiment allows rejection of less than a plurality of scan data bits representing dark video information as noise. The number of resistors 114 and their values can be chosen to provide any desired noise rejection threshold characteristic. Threshold detector 113 of this embodiment can be a simple Schmitt trigger.

OPERATION

The operation of the instant invention can be best comprehended by referring to FIG. 2. FIG. 2 shows the letter "V" both before and after selection and registration of scan data bits representing that alpha-numeric character. The letter "V" is scanned from bottom to top and right to left by scanning unit 10 of FIG. 4. In the example of FIG. 2, chosen for illustration purposes only, each vertical scan contains 16 bits. As each scan data bit is received from the video detector 70 of scanning unit 10, a bit rate clock pulse is received from timing generator 50. The bit rate clock pulses will advance counter 131 of FIG. 1 each time a scan data bit is received. Therefore, at the end of the first scan, counter 131 will contain a count of 16. As has been explained earlier, a segmentation pulse following a previous character, or generated during a power-on reset cycle, has loaded register 141 with a full count of all ones. Since the maximum number that can be stored in register 141 is larger than the maximum number of video data bits in any scan, an output will not appear on output 145 during the first two vertical scans. During the third vertical scan, a scan data bit representing dark area will be received with the 13th bit rate clock pulse. Counter 131 has been reset at the start of the third scan by scan start pulse on line 135. Counter 131 thereafter is advanced by bit rate clock pulses, effectively counting the number of bits between the start of the present scan and black bits representing a character in the present scan. The video data bit representing a portion of the character will be detected by detection means 110, which will in turn set latch 123 of control means 120 causing single-shot 125 to generate a "character detected" pulse on line 129. Since the number of bits between the start of the present third scan and the bits representing the character is less than the number stored in register 141, an *x*th and following data bits are effectively selected by opening AND-gate 151 when data bits representing a portion of the character are first received. The output of single shot 125 causes a bit to be stored in the first position of shift register 159. An output from the first stage of shift register 159 opens the first gate of gates 157 to allow the first video data bit, representing a portion of the character, to be stored in the first position of storage register 155. The pulse on line 129 also opens gate 137 to store the count of 13 , which has been generated in counter 131, into register 141. Compare unit 139 will provide an output at this time; but, since latch 123 is already set, this output is redundant, and does not cause erroneous operation. The 14th bit rate clock pulse will advance shift register 159 and counter 131. Another dark video data bit will be gated through AND-circuit 151 into the second stage of storage register 155. In like manner, the next two light (i.e., background) video data bits will be gated into storage register 155. At the end of the third scan, a scan end pulse will be received which will reset latch 123 and open gate 161 to transfer the video data bits stored in register 155 into shift register 163. Since register 155 had contained all zeros prior to storage of the last four bits of the third scan, shift register 163 will contain the information shown in the right vertical column of FIG. 2B. After a short time delay provided by delay circuit 165, storage registers 155 and shift register 159 will each be reset to zero in preparation for receiving information from the next or fourth scan. As the fourth scan is commenced and scan data bits are received at the bit rate clock rate frequency, the information in shift register 163 is shifted out onto transmission line 168 to the centrally located recognition logic unit 11 by the transmit rate clock. Concurrent with the beginning of this next fourth scan, another scan start pulse was provided to counter 131, resetting it to zero.

Video data bits received from the scanning unit 10 during vertical scans 4 through 11 undergo selection and registration as did the data bits of the third scan. At the end of the 11th scan, the number 3 will be stored in register 141.

During the 12th scan, registration reference means 130 will provide an output on line 145 prior to a scan data bit representing a portion of the character being detected by detection means 110. While the third data bit (which is a light video bit) is being received, counter 131 and register 141 will be both contain the number 3. This will allow compare circuit 139 to generate an output on line 145 causing latch 123 to set. Under these conditions, the present number of bits between the start of the present scan and bits representing a character within the present scan, is greater than the previous number of bits between the start of the previous scan and data representing a character in the previous scan. Therefore, AND-gate 151 is opened when counter 131 reaches the previous count of three. Under these circumstances, the first data bit stored in storage register 155 is a light data bit and the remaining data bits of the 12th scan are sequentially stored in storage register 155. At the end of the 12th scan, the data bits in storage register 155 are again transferred into shift register 163 for transmission to recognition logic unit 11. This procedure is continued until the entire character has been scanned.

As the selected and registered video data bits of each scan are transmitted to recognition logic 11, they are stored in a memory until the full character has been scanned. After the character has been completely scanned, a segmentation pulse is generated within scanning unit 10 to fill register 141 in preparation for selecting and registering data bits for the subsequent character. Thus whenever the present scan is a first scan after an end of character pulse, the number stored in shift register 141 is greater than the maximum number of bits between the scan start pulse of a previous scan and a first bit representing a portion of a character in the previous scan. The segmentation pulse may be generated by scanning unit 10 whenever an all-light or blank scan occurs following a character. Alternatively, the segmentation pulse may be generated within recognition logic 11 by any of a number of known techniques. In the manner set out above, scan data bits from each scan are selected and registered and gated to the recognition logic unit for efficient and unambiguous character recognition.

While the invention has been particularly shown and described with respect to a preferred embodiment thereof, it will be understood by those skilled in the art that various changes in form and detail may be made therein without departing from spirit and scope of the invention. For example, it is recognized that shift register 159, storage register 155, and shift register 163 of gating means 150 could be replaced by data-storage control apparatus within recognition logic unit 11, so that gating means 150 need consist only of AND-circuit 151. It is further recognized that variations in the number of dark data bits to be recognized as a character can be made, thereby varying the noise rejection threshold of detection means 110. For example, a single dark data bit might be rejected as noise, whereas three consecutive dark data bits might be recognized as bits representing a character.

What is claimed is:

1. A method of selecting and registering data bits in each scan from a series of scans which represent an input pattern, comprising the steps of:

counting a present number of bits between a start of a present scan and a predetermined data bit representing a portion of a character in said present scan;

comparing said present number of bits with a previous number of bits, said previous number of bits representing a number of bits between a start of a previous scan and a predetermined data bit representing a portion of a character in said previous scan;

selecting an xthe and following data bits of said present scan where X is equal to said present number of bits whenever said previous number of bits bears a first relationship to said present number of bits, and where X is equal to said previous number of bits whenever said previous number of bits bears a second relationship to said present number of bits;

gating said selected data bits to a utilizing means.

2. The method of claim 1 wherein said selecting step further comprises the step of generating said previous number of bits for said present scan by storing a present number of bits for said previous scan in a first register whenever said present number of bits for said previous scan is less than said previous number of bits for said previous scan.

3. The method of claim 2 wherein said previous number of bits for the first scan in said series is set to be greater than a maximum number of bits in any scan of said series.

4. The method of claim 2 wherein said first and second relationships are respectively satisfied when said previous number of bits is greater than and less than said present number of bits.

5. The method of claim 2 wherein said predetermined data bit in each scan is the first bit in that scan which belongs to said input pattern.

6. The method of xth and further comprising the step of detecting a relationship among neighboring data bits within each scan, and wherein said predetermined data bit is the first data bit of that scan which satisfies said last-named relationship.

7. The method of claim 2 wherein said selected bits are gated to said utilization means at a rate lower than the rate at which said data bits are selected.

8. Apparatus for registering a series of scans having data bits representing an input pattern, said apparatus comprising:

registration reference means having a clock input for receiving a clock pulse in response to one of said data bits, and having a scan-start input for receiving a pulse at the start of each scan, and having a pattern-detected input for receiving a pulse whenever bits representing said pattern are first detected in data from each scan, and a compare means for providing an output whenever a number of said clock pulses received after said scan-start pulse is equal to a predetermined number of clock pulses;

control means having a first input responsive to said output of said detection means and a second input responsive to said output of said registration means, said control means having a first output which is activated whenever an output has been first received from said detection means or whenever an output has been first received from said registration means, whichever occurs earlier in time, said control means having a second output which provides a pattern-detected pulse whenever said first output of said control means is activated, said second output being connected to said pattern-detected input of said registration means;

gate means having a data input for receiving said data bits and having a first control input connected to said first output of said control means, for selected data bits from each of said scans representing a portion of said input pattern.

9. The apparatus of claim 8 wherein said registration reference means includes means for generating said predetermined number from an output of said control means during a previous scan.

10. The apparatus of claim 9 wherein said control means includes a third input for receiving a scan-end pulse at the end of each scan, and further includes means responsive to said scan-end pulse for deactivating said first output of said control means.

11. The apparatus of claim 10, further comprising detection means having an input for receiving said data bits from a scanning unit, said detection means providing an output to said registration reference means whenever data bits representing a portion of said pattern are detected.

12. The apparatus of claim 11 wherein said detection means comprises:

storage means for temporarily storing a plurality of said data bits, and providing voltages representing said data bits;

a plurality of weighting means, each being connected to said storage means for multiplying said voltages from said storage means by predetermined amounts;

a threshold sensing means connected to each of said weighting means for providing an output when a sum of voltages received from said weighting means exceeds a predetermined voltage, said output from said threshold sensing means being said output from said detection means.

13. The apparatus of claim 10 wherein said control means further comprises:

OR circuit means connected to said detection means and to said compare means for providing an output whenever an output is received from said detection means and whenever an output is received from said compare means;

bistable storage means connected to said OR circuit means and to said third input of said control means for storing said output from said OR circuit means, said bistable means being reset by said scan-end pulse, said bistable means having an output connected to said first output of said control means;

pulse generator means connected to said output of said bistable means for generating a single pulse whenever said output from said OR circuit means is first stored in said bistable means, said pulse generator means having an output connected to said second output of said control means.

14. The apparatus of claim 10 wherein said gate means includes means for transmitting the selected bits from each of said scans to a utilization means, the rate of said transmission being smaller than the rate of said clock pulses.

* * * * *

PO-1050
(5/69)

UNITED STATES PATENT OFFICE
CERTIFICATE OF CORRECTION

Patent No. 3,651,462 Dated March 21, 1972

Inventor(s) Gerald J. Balm

It is certified that error appears in the above-identified patent and that said Letters Patent are hereby corrected as shown below:

Claim 1, line 12, the word --Xth-- is incorrectly written as "xthe".

Claim 6, line 1, after the word "of" delete -"xth and" and insert --Claim 2--.

Signed and sealed this 19th day of September 1972.

(SEAL)
Attest:

EDWARD M.FLETCHER,JR.
Attesting Officer

ROBERT GOTTSCHALK
Commissioner of Patents